US008325828B1

(12) United States Patent  
Liu et al.

(10) Patent No.: US 8,325,828 B1
(45) Date of Patent: Dec. 4, 2012

(54) METHOD AND APPARATUS FOR DETECTING IMPULSE NOISE

(75) Inventors: Peter Tze-Hwa Liu, Alameda, CA (US); Vladan Petrovic, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 908 days.

(21) Appl. No.: 12/044,762

(22) Filed: Mar. 7, 2008

Related U.S. Application Data

(60) Provisional application No. 60/893,786, filed on Mar. 8, 2007.

(51) Int. Cl.
*H04K 1/10* (2006.01)
(52) U.S. Cl. ........................................ 375/260; 375/259
(58) Field of Classification Search .................. 375/260, 375/259
See application file for complete search history.

(56) References Cited

U.S. PATENT DOCUMENTS

| | | | |
|---|---|---|---|
| 4,707,839 A * | 11/1987 | Andren et al. ................. | 375/150 |
| 5,793,318 A * | 8/1998 | Jewett ............................ | 341/118 |
| 6,608,864 B1 | 8/2003 | Strait | |
| 6,973,296 B2 | 12/2005 | Webster et al. | |
| 7,551,514 B2 | 6/2009 | Kim et al. | |
| 7,711,059 B2 | 5/2010 | Yeh et al. | |
| 7,760,826 B2 | 7/2010 | Chang | |
| 8,094,710 B1 | 1/2012 | Liu | |
| 2002/0114378 A1* | 8/2002 | Yue ............................... | 375/136 |
| 2005/0286566 A1 | 12/2005 | Tong et al. | |
| 2006/0193390 A1* | 8/2006 | Sedarat ......................... | 375/260 |
| 2007/0183526 A1 | 8/2007 | Norrell et al. | |
| 2007/0201574 A1 | 8/2007 | Wu et al. | |
| 2007/0217526 A1 | 9/2007 | Park et al. | |
| 2009/0073869 A1 | 3/2009 | Chadha et al. | |

OTHER PUBLICATIONS

"Final Draft ITU-T Recommendation G.993.2," ITU, Feb. 2006.
Armstrong, et al. "Frequency Domain Equalization for PCC-OFDM with overlapping symbol periods" (2000).

* cited by examiner

*Primary Examiner* — Shuwang Liu
*Assistant Examiner* — Michael Neff

(57) ABSTRACT

A formatted data unit that was transmitted by a transmitter is received at a receiver. Received signal points are determined based on the received formatted data unit. Actual transmitted signal points corresponding to the received formatted data unit is determined at the receiver based on information known a priori by the receiver. An error is determined between the received signal points and the actual transmitted signal points determined at the receiver. An indicator of impulse noise is generated based on the error.

21 Claims, 8 Drawing Sheets

METHOD AND APPARATUS FOR DETECTING IMPULSE NOISE

CROSS-REFERENCES TO RELATED APPLICATIONS

The present application claims the benefit of U.S. Provisional Application No. 60/893,786, entitled "PMD IMPULSE NOISE DETECTION AND ERASURE GENERATION," filed on Mar. 8, 2007, the entire contents of which are hereby incorporated by reference herein.

FIELD OF TECHNOLOGY

The present disclosure relates generally to communication systems, and more particularly to detecting when noise has potentially corrupted received data.

DESCRIPTION OF THE RELATED ART

Orthogonal frequency-division multiplexing (OFDM) is a digital multi-carrier modulation scheme that employs a large number of relatively closely spaced orthogonal sub-carriers or sub-channels. Each sub-carrier is modulated with a modulation scheme such as quadrature amplitude modulation, phase shift keying, etc., at a relatively low symbol rate. Even though data on a particular sub-carrier is modulated at a low symbol rate, the large number of sub-channels provides an overall data rate similar to single-carrier modulation schemes that utilize the same bandwidth. An advantage of OFDM over single-carrier modulation schemes is its ability to cope with severe channel conditions such as, multipath and narrowband interference. For instance, the relatively low symbol rate allows the use of a guard interval between symbols to help manage time-domain spreading of the signal due to multipath propagation.

Some OFDM modulation schemes utilize pilots for synchronization, channel estimation, etc., for example. In these systems, pilot signals may be sent in one or more sub-channels. The sub-channels in which a pilot is sent may be the same for each OFDM symbol or the sub-channels may vary between OFDM symbols.

A type of OFDM modulation, often referred to as discrete multi-tone (DMT) modulation, is utilized in some digital subscriber line (DSL) systems. In DMT modulation, modulation is adapted based on channel conditions associated with each sub-carrier. This is often accomplished by adjusting the bit rate of a sub-carrier. In particular, when a signal-to-noise ratio (SNR) for a sub-carrier is high, data may be transmitted on this sub-carrier at a higher bit rate; whereas if the SNR is low, a lower bit rate is used. Thus, in one DMT symbol, some sub-channels may carry more bits than others. This is often referred to as "bit-loading".

Typically, forward error correction (FEC) techniques are used in conjunction with OFDM. For example, Reed-Solomon (RS) codes are often used in DSL systems. In RS codes, k symbols are used to generate a codeword of length-n symbols, where n>k. In other words, each RS codeword includes k actual symbols and n−k redundant symbols. The error-correcting ability of an RS code is based on the value n−k, which is a measure of redundancy of the codeword. If the locations of probable symbol errors are not known in advance, then a Reed-Solomon code can correct up to (n−k)/2 erroneous symbols i.e., a Reed-Solomon code can correct half as many errors as there are redundant symbols in the codeword. But sometimes information about the locations of symbols that are likely in error is known in advance. For example, if the SNR corresponding to a symbol is below some threshold, this symbol may be flagged as probably being in error or indeterminate (i.e., an erasure). An RS code, is able to correct twice as many erasures as errors, and any combination of errors and erasures can be corrected as long as the inequality $2E+S \leq n-k$ is satisfied, where E is the number of errors and S is the number of erasures in the codeword.

SUMMARY OF THE DISCLOSURE

In one embodiment, a method includes receiving at a receiver a formatted data unit transmitted by a transmitter, and determining received signal points based on the received formatted data unit. The method also includes determining at the receiver actual transmitted signal points corresponding to the received formatted data unit based on info ration known a priori by the receiver. Additionally, the method includes determining an error between the received signal points and the actual transmitted signal points determined at the receiver, and generating an indicator of impulse noise based on the error.

In another embodiment, an impulse noise detector comprises a signal generator to generate actual transmitted signal points based on information known a priori by a receiver, and an error measurement device to generate an indicator of impulse noise based on errors between actual transmitted signal points generated by the signal generator and received signal points.

In yet another embodiment, a method includes receiving at a receiver an orthogonal frequency-division multiplexing (OFDM) symbol having first sub-carriers that do not carry payload data and second sub-carriers that carry payload data. Additionally, the method includes determining first received signal points corresponding to first sub-carriers of the received OFDM symbol. The method also includes determining at the receiver actual transmitted signal points corresponding to the first received signal points based on information known a priori by the receiver. The method further includes determining an error between the first received signal points and the actual transmitted signal points determined at the receiver. Still further, the method includes generating an indicator of impulse noise based on the error, and generating an indicator of erasures in the payload data based on the indicator of impulse noise.

In still another embodiment, an apparatus for use in a receiver comprises a Viterbi decoding device to generate Trellis-decoded symbols based on a received orthogonal frequency-division multiplexing (OFDM) symbol. The OFDM symbol includes first sub-carriers that do not carry payload data and second sub-carriers that carry payload data. The apparatus additionally comprises an impulse noise detector to generate an indicator of impulse noise based on received first sub-carriers and actual transmitted signal points corresponding to first sub-carriers recreated by the impulse noise detector based on information known a priori by the receiver. Also, the apparatus comprises an erasure detector to generate indications of erasures in payload data based on the impulse noise indicator.

DETAILED DESCRIPTION

Embodiments of apparatus and methods for detecting impulse noise in a receiver are described below. Among other things, impulse noise detection may be useful for decoding received signals that have been encoded using an FEC code. For example, detection of impulse noise may be utilized to indicate erasures.

The embodiments described below generally relate to detecting impulse noise at a receiver (which may be part of a transceiver device) based on transmitted information that is known a priori by the receiver (e.g., the receiver has knowledge of what should have been transmitted by a transmitter). The a priori information may be included within a data unit such as a packet, an OFDM symbol such as a DMT symbol, etc., and the data unit may also include information that is not known a priori by the receiver. For instance, in a communication system that utilizes OFDM modulation, the data unit may be an OFDM symbol, and the a priori information may include pilot tones in the OFDM symbol. As used herein, the term "OFDM symbol" refers to the collection of sub-channels during a defined period referred to as the OFDM symbol period. For example, an OFDM symbol may include a plurality of sub-channels, at least some of which are modulated with data for some defined period of time that is the OFDM symbol period (e.g., the OFDM symbol period may be defined by a communication protocol). In a typical OFDM symbol, each of some of the sub-channels may carry one or more symbols (e.g., bits) within the OFDM symbol period. In other words, the "OFDM symbol" may include a plurality of symbols that are modulated on the sub-channels. A "DMT symbol" is just a type of an OFDM symbol used in DMT modulation systems.

Figure 1:
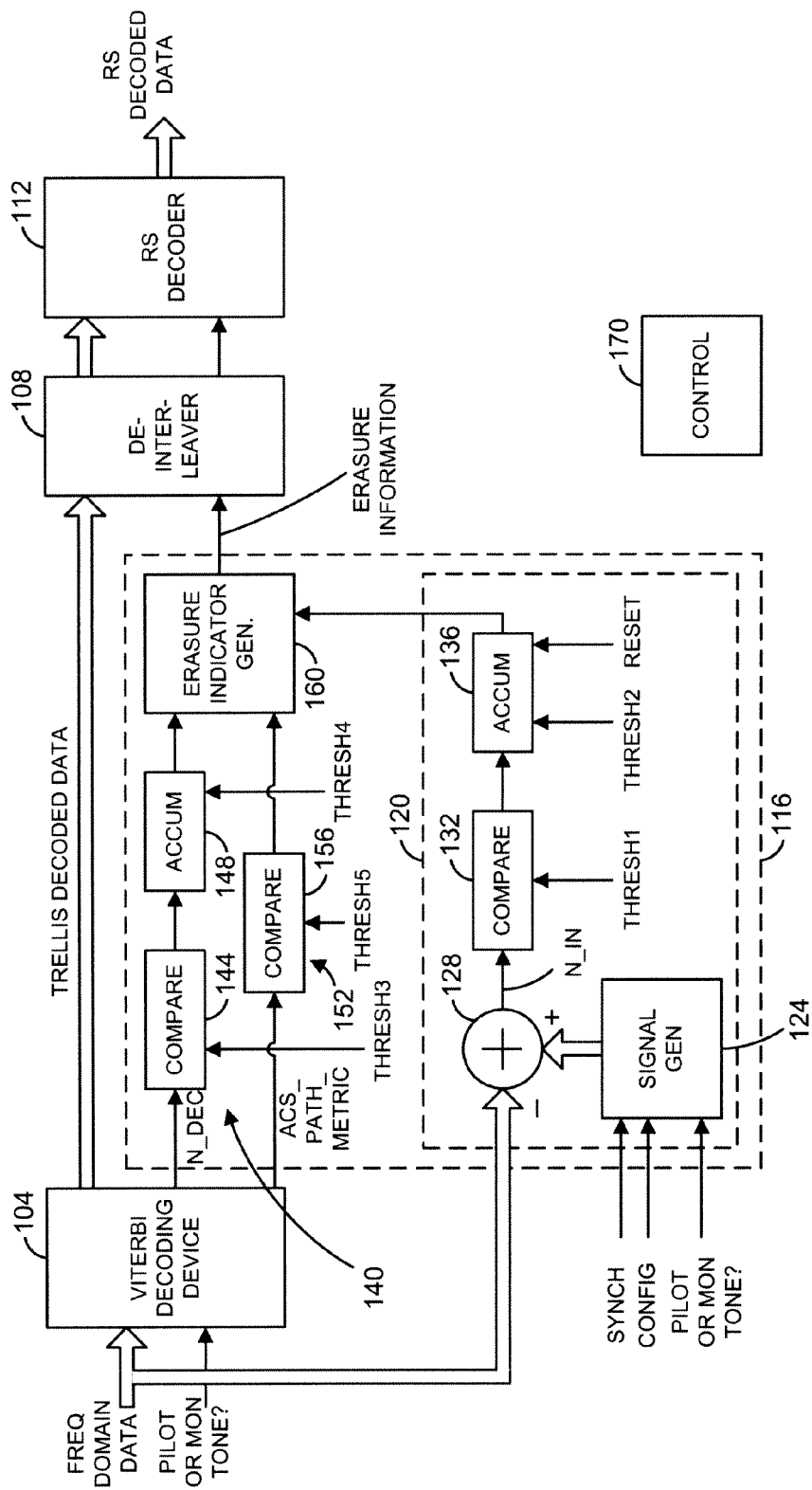
FIG. 1 is a block diagram of an example portion of a DSL receiver that utilizes impulse noise and erasure detection.

FIG. 1 is a block diagram of an example decoding system 100 for use in a receiver portion of a digital subscriber line (DSL) transceiver that utilizes DMT modulation. The decoding system 100 includes a Viterbi decoding device 104 that may include a Viterbi decoder and a slicer. The Viterbi decoding device 104 may receive frequency domain data from a fast Fourier transform (FFT) calculator (not shown) of the DMT receiver directly or indirectly (e.g., the frequency domain data may or may not be processed between the FFT calculator and the Viterbi decoding device 104). The frequency domain data may include quadrature amplitude modulated (QAM) data for each of a plurality of sub-channels. For example, the frequency domain data may represent in phase (I) and quadrature (Q) coordinate data (i.e., a signal point) for each of the sub-channels. The frequency domain data may be received by the Viterbi decoding device in parallel or serially. For example, data for a plurality of sub-channels could be provided in parallel. Alternatively, data for a plurality of sub-channels could be provided serially, in an order known by the Viterbi decoding device 104, for example.

The Viterbi decoding device 104 may also receive an indicator that indicates which sub-channels correspond to signals known a priori by the receiver. For example, the indicator may indicate which sub-channels correspond to pilot tones, which are sub-channels that, in effect, transmit a fixed sequence that is known a priori by the receiver. The indicator may also indicate sub-channels often referred to as "monitored tones", which are sub-channels modulated according to a pseudo-random bit sequence (PRBS). As will be discussed below, if the receiver can recreate the pseudo-random sequence, the receiver will know a priori the information carried on the "monitored tones." The Viterbi decoding device 104 may ignore sub-channels that correspond to signals known a priori by the receiver, such as pilot tones and monitored tones.

Figure 2:
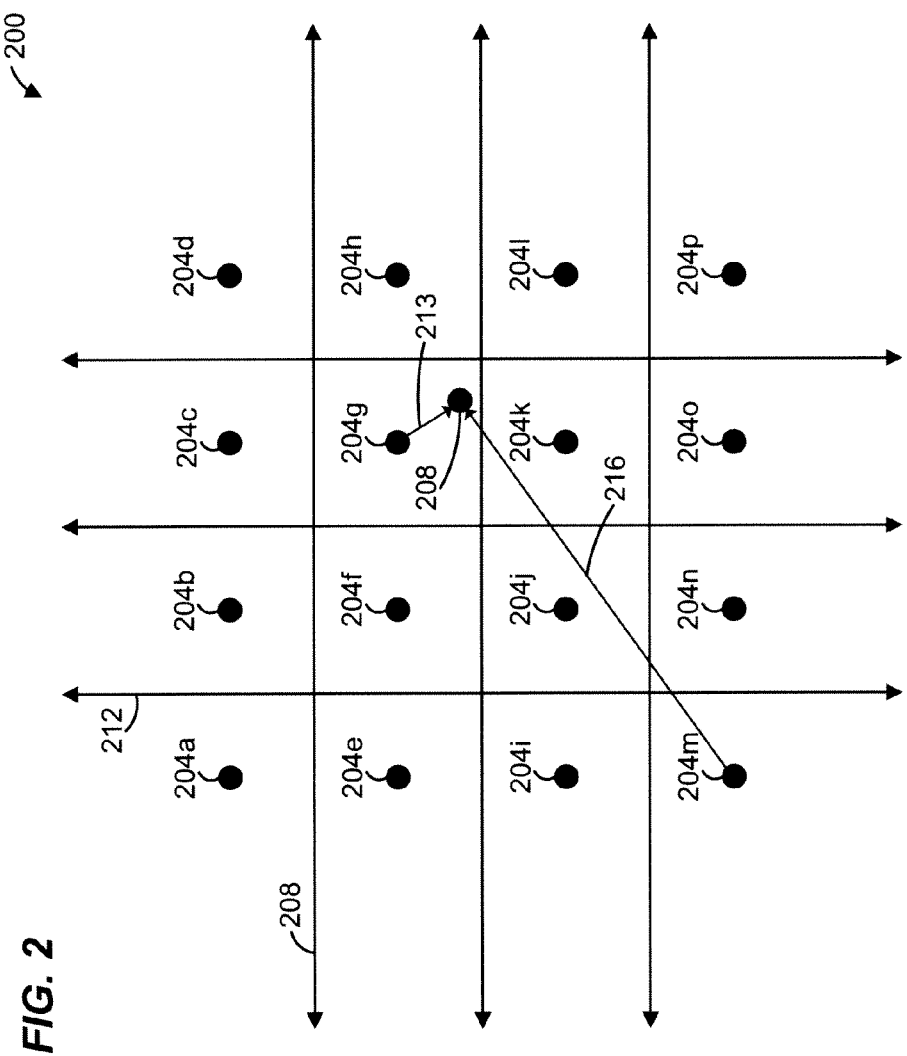
FIG. 2 is a quadrature amplitude modulation (QAM) constellation diagram.

The Viterbi decoding device 104 attempts to decode the frequency domain data that was encoded at the transmitter using a Trellis encoding process. If the frequency domain data is QAM data, this may involve detecting QAM constellation points that correspond to the frequency domain data. FIG. 2 is a QAM constellation diagram. In particular, FIG. 2 illustrates a 16-QAM constellation diagram 200. The constellation 200 includes 16 QAM points 204 that correspond to particular symbols or bit sequences. For example, each point 204 could correspond to a different symbol, and each symbol may correspond to a different 4-bit sequence. The vertical and horizontal lines in FIG. 2 indicate decision boundaries. For example, if a received point falls above the line 208 and to the left of the line 212, the receiver may decide that the point 204a was transmitted. As another example, if a received point falls within the box surrounding the point 204f, the receiver may decide that the point 204f was transmitted.

Referring again to FIG. 1, the Viterbi decoding device 104 may select constellation points corresponding to the frequency domain data. Also, the Viterbi decoding device 104 may generate decoded symbols or bit sequences corresponding to the selected constellation points. Converting the frequency domain data to decoded symbols may be referred to as "mapping" the frequency domain data to decoded symbols. Optionally, the Viterbi decoding device 104 also may generate error information associated with the decoded symbols. Referring to FIG. 2, if the point 208 is received, for example, the Viterbi decoding device 104 may select point 204g as the transmitted point. The Viterbi decoding device 104 may calculate an error 213 between the received point 208 and the selected point 204g. The Viterbi decoding device 104 may generate a signal N_DEC based on the error 213. The signal N_DEC could be the calculated error 213 or an amplitude of the error 213, for example. FIG. 2 is a simplified illustration of mapping received signal points to constellation points to show principles of calculating error information associated with decoded symbols. One of ordinary skill in the art will recognize that actual mapping of Trellis encoded signal points is more complex than illustrated in FIG. 2 and involves selecting a "coset" as opposed to a constellation point. However, the principle of calculating an error associated with a selected coset is the same.

The error 213 is determined based on the constellation points or cosets selected by the decoding device 104, as opposed to the actual constellation points or cosets that were transmitted, and the constellation points or cosets selected by the decoding device 104 may not be the actual constellation points or cosets that were transmitted. For example, if noise in the channel is high, the decoding device 104 may make an error in selecting the constellation point or coset. For example, suppose the point 204*m* was actually transmitted by the transmitter, but because of noise in the communication channel, the receiver received the point 208. The decoding device 104 may select the point 204*g* as the constellation point and determine that the corresponding error is the error 213. But in fact, the actual error (i.e., the error between the actual transmitted point 204*m* and the received point 208) is an error 216.

As is well known to those of ordinary skill in the art, the Viterbi decoding device 104 calculates path metrics associated with possible sequences of transmitted symbols. The Viterbi decoding device 104 utilizes the path metrics to select one of the sequences as the most likely to have been transmitted. The path metric for the selected path may be indicative of an accumulation of errors in the received data. The Viterbi decoding device 104 may generate a signal (PATH_METRIC) based on the path metric for the selected path.

The data decoded by the Viterbi decoding device 104 (i.e., trellis decoded data) is provided to a de-interleaver 108, which attempts to reverse an interleaving process performed at the transmitter. In one embodiment, interleaving is utilized to mitigate bursts of errors introduced in the communication channel. For example, without interleaving a burst of errors may render one or two codewords (e.g., RS codewords) uncorrectable because of the numbers of errors in these codewords. But with interleaving/de-interleaving, the burst of errors may be spread out among many codewords so that each codeword only has a relatively small number of errors. This may improve the probability that an FEC decoder, such as an RS decoder, can correct the errors.

An output of the de-interleaver 108 (i.e., de-interleaved data) is provided to an RS decoder 112. The RS decoder 112 attempts to correct any errors in the de-interleaved data, and generates RS decoded data. The RS decoder 112 utilizes erasure information, which is provided by an erasure detector 116. In particular, the erasure information may indicate, for example, the locations of erasures in the Trellis decoded data, and the erasure information may be provided to the de-interleaver 108. The de-interleaver 108 may process the erasure information so that the erasure information indicates, for example, the locations of erasures in the de-interleaved data. The erasure information processed by the de-interleaver 108 may be provided to the RS decoder 112.

The erasure detector 116 includes a first impulse noise detector 120. Generally, the first impulse noise detector 120 attempts to detect impulse noise in a received DMT symbol. Additionally, the first impulse noise detector 120 generates an indicator to indicate when impulse noise is detected in a DMT symbol.

The first impulse noise detector 120 includes a signal generator 124 that generates signals corresponding to information known a priori by the receiver. For example, the signal generator 124 may generate QAM signals or I/Q coordinate pairs (i.e., signal points) corresponding to pilot tones and monitored tones in a DMT symbol. The signals generated by the signal generator 124 correspond to signals that would have been received by the receiver if there were no errors. In other words, the signal generator 124 generates the actual signal points transmitted by the transmitter. This is in contrast decoded signal points, such as signal points selected by the decoding device 104.

In order to generate signals corresponding to monitored tones, the signal generator 124 may include a PRBS generator the same as or similar to a PRBS generator at the transmitter. The PRBS generator of the signal generator 124 may permit the signal generator 124 to recreate the PRBS used by the transmitter to generate the actual monitored tones.

The signal generator 124 also may include an apparatus to convert the output of the PRBS generator into QAM signals or I/Q coordinate pairs or signal points. If the signal generator 124 generates I/Q coordinate pairs, the conversion apparatus may include a lookup table (LUT) and/or digital logic, for example, that converts the PRBS to I/Q coordinate pairs.

The signal generator 124 may receive configuration information for use in generating the signals corresponding to information known a priori by the receiver. For example, the configuration information may include information indicative of which sub-channels correspond to pilot tones. Additionally, the configuration information may include information indicative of which sub-channels correspond to monitored tones, for example. Further, the configuration information may include information for configuring the PRBS generator, for example. For instance, the configuration information may include a seed for the PRBS generator. The configuration information optionally may be based on data exchanged between the receiver and the transmitter, for example. For instance, in at least some DSL systems utilizing DMT, the receiver may select which sub-channels will carry pilot tones and which sub-channels will carry monitored tones. The receiver then transmits to the transmitter information indicative of which sub-channels are to carry pilot tones and which sub-channels are to carry monitored tones. In other systems, the transmitter may select which sub-channels will carry pilot tones and which sub-channels will carry monitored tones, and the transmitter may then transmit to the receiver information indicative of which sub-channels are to carry pilot tones and which sub-channels are to carry monitored tones. In still other systems, the sub-channels that carry pilot tones and/or monitored tones are fixed and cannot be changed, and thus known ahead of time by the receiver.

In DSL systems that utilize DMT modulation, a transmitter and receiver may negotiate which sub-carriers will be used, which sub-carriers will be pilot tones, which sub-carriers will be monitored tones, etc. For example, there may be N possible sub-carriers that can be utilized, where N is a positive integer. The power of a particular sub-carrier may be represented as $g_i$, where i is an index indicating to which of the N sub-carriers the value g corresponds. The number of bits that a sub-carrier will carry (i.e., the bit loading) may be represented as $b_i$. Thus, sub-carriers that will not be used correspond to sub-carriers in which $g_i=0$. Also, pilot tones and monitored tones both correspond to sub-carriers in which $g_i \neq 0$ and $b_i=0$. Pilot tones and monitored tones are not trellis encoded and thus are not operated on by the decoding device 104. Sub-carriers for which $g_i \neq 0$ and $b_i \neq 0$ correspond to Trellis encoded data that is decoded by the decoding device 104. These sub-carriers may be used for transmitting payload information, for example. Thus, a DMT symbol may have a payload portion that includes sub-carriers for which $g_i \neq 0$ and $b_i \neq 0$. The pilot tones and monitored tones are not part of the payload portion.

The signal generator 124 also may receive control information for use in generating the signals corresponding to information known a priori by the receiver. For example, the signal generator 124 may receive a signal or signals that indicate which signal points correspond to pilot tones or monitored tones. Additionally, the signal generator 124 may receive a synchronization signal corresponding to the PRBS generator. For example, the synchronization signal may be utilized by the signal generator 124 so that the PRBS generated by the PRBS is synchronized with the frequency domain data being received by the Viterbi decoding device 104. At least some of the control information may be based on data sent to the receiver by the transmitter, for example. For instance, the transmitter may transmit a signal that indicates the start of the PRBS.

The first impulse noise detector 120 may include a subtraction device 128 coupled to the signal generator 124. The subtraction device 128 also receives frequency domain data that is also received by the Viterbi decoding device 104. The subtraction device 128 generates an error signal (N_IN) that indicates the actual errors in received pilot tones and monitored tones. Referring again to FIG. 2, the received point 208 may correspond to a monitored tone. If the actual transmitted point was 204m, this would correspond to a relatively large error 216. If a priori information were not used, the receiver might assume that the point 204g was transmitted, which would correspond to the much smaller error 213. In other words, in some circumstances, a relatively large error might be interpreted as only a small error if a priori information is not available or not utilized. On the other hand, the first impulse noise detector 120 utilizes information known a priori to detect actual errors, such as the actual error 216. In particular, the subtraction device 128 generates error signals that correspond to actual errors in the frequency domain data. The error signal (N_IN) generated by the subtraction device 128 may be an error vector or an error magnitude.

Although not shown in FIG. 1, the subtraction device 128 optionally may receive a signal or signals that indicate whether data being received by the Viterbi decoding device 104 corresponds to a pilot tone or a monitored tone. The subtraction device 128 may utilize such signals so that the subtraction device 128 does not generate an error signal output for frequency domain data that are not to be used by the first impulse noise detector 120, such as frequency domain data corresponding to sub-channels that are not pilot tones or monitored tones.

The first impulse noise detector 120 also may include a comparator 132 coupled to the subtraction device 128. The comparator 132 may compare an error signal from the subtraction device 128 to a first threshold. For example, if the error signal is a vector, the comparator may compare a magnitude of the vector to the first threshold. When the error satisfies the threshold, the comparator may generate an indicator signal. Each indicator signal may indicate whether a pilot tone or monitored tone had an actual error that caused the first threshold to be exceeded. An accumulator device 136 is coupled to the comparator 132 and may accumulate, or count, the number of pilot tones or monitored tones in a DMT symbol in which an actual error caused the first threshold to be exceeded. The accumulator device 136 also may compare the count (or accumulation) to a second threshold, and if the count satisfies the second threshold, the accumulator device 136 may generate a signal indicating that the second threshold was exceeded. The accumulator device 136 may receive a reset signal to reset the count (or accumulation) for the next DMT symbol. Generally, if the second threshold is exceeded, this may indicate impulse noise in the DMT symbol.

In another embodiment, the comparator 132 may be omitted. In such an embodiment, the accumulation device 136 may accumulate errors N_IN corresponding to a DMT symbol. If the accumulated error satisfies a threshold, this may indicate impulse noise in the DMT symbol.

Optionally, the erasure detector 116 may includes a second impulse noise detector 140. Generally, the second impulse noise detector 140 attempts to detect impulse noise in a received DMT symbol based on data decoded by the Viterbi decoder device 104. Additionally, the second impulse noise detector 140 generates an indicator to indicate when impulse noise is detected in a DMT symbol.

The second impulse noise detector 140 includes a comparator 144 coupled to the Viterbi decoding device 104. The comparator 144 receives the error signal N_DEC from the Viterbi decoding device 104 and compares N_DEC to a third threshold. For example, if the error signal N_DEC is a vector, the comparator 144 may compare a magnitude of the vector to the third threshold. When the error satisfies the threshold, the comparator 144 may generate an indicator signal. Each indicator signal may indicate whether a constellation point selected by the Viterbi decoding device 104 had an associated error (N_DEC) that caused the third threshold to be exceeded. An accumulator device 148 is coupled to the comparator 144 and may accumulate, or count, the number of selected constellation points having a corresponding error that caused the third threshold to be exceeded. The accumulator device 148 also may compare the count (or accumulation) to a fourth threshold, and if the count satisfies the fourth threshold, the accumulator device 148 may generate a signal indicating that the fourth threshold was exceeded. The accumulator device 148 may receive a reset signal (not shown) to reset the count (or accumulation) for the next DMT symbol. Generally, if the fourth threshold is exceeded, this may indicate impulse noise in the DMT symbol.

In another embodiment, the comparator 144 may be omitted. In such an embodiment, the accumulation device 148 may accumulate errors N_DEC corresponding to a DMT symbol. If the accumulated error satisfies a threshold, this may indicate impulse noise in the DMT symbol.

Optionally, the erasure detector 116 may include a third impulse noise detector 152. Similar to the second impulse noise detector 140, the third impulse noise detector 152 generally attempts to detect impulse noise in a received DMT symbol based on data decoded by the Viterbi decoder device 104. Additionally, the third impulse noise detector 152 generates an indicator to indicate when impulse noise is detected in a DMT symbol.

The third impulse noise detector 152 includes a comparator 156 coupled to the Viterbi decoding device 104. The comparator 156 receives the path metric signal from the Viterbi decoding device 104 and compares the path metric signal to a fifth threshold. When the path metric satisfies the threshold, the comparator 156 may generate an indicator signal. Generally, if the fifth threshold is exceeded, this may indicate impulse noise in the DMT symbol.

The erasure detector 116 also may include an erasure indicator generator 160, which may be coupled to the first impulse noise detector 120, the second impulse noise detector 140 (if included), and the third impulse noise detector 152 (if included). The erasure indicator generator 160 may receive the impulse noise indicator generated by the first impulse noise detector 120 and may generate an erasure indicator based on the impulse noise indicator from the first impulse noise detector 120. For example, if the impulse noise indicator from the first impulse noise detector 120 indicates impulse noise, the erasure indicator generator 160 may generate the erasure signal to indicate that trellis decoded data from the DMT symbol should be considered erasures.

If the erasure indicator generator 160 receives the impulse noise indicator generated by the second impulse noise detector 140, the erasure indicator generator 160 may generate the erasure indicator further based on the impulse noise indicator from the second impulse noise detector 140. Similarly, if the erasure indicator generator 160 receives the impulse noise indicator generated by the third impulse noise detector 152, the erasure indicator generator 160 may generate the erasure indicator further based on the impulse noise indicator from the third impulse noise detector 152. For instance, if the erasure indicator generator 160 receives more than one impulse noise indicator, the erasure indicator generator 160 may generate the erasure indicator based on whether at least one impulse noise indicator indicates impulse noise, whether at least two impulse noise indicators indicate impulse noise, etc. Additionally, the erasure indicator generator 160 may generate the erasure indicator further based on information other than impulse noise indicators. The erasure indicator is provided to the de-interleaver 108.

The erasure indicator generator 160 may be configurable. For example, the erasure indicator generator 160 may be configured to ignore one or more of the impulse noise indicators generated by the first, second and third impulse noise generators 120, 140, 152. As another example, the erasure indicator generator 160 may be configured to generate the erasure indicator based on different logical combinations of the impulse noise indicators from the first, second and third impulse noise generators 120, 140, 152.

In operation, the first impulse noise detector 120 detects impulse noise based on information that is known a priori by the receiver. Optionally, the second impulse noise detector 140 and/or the third impulse noise detector 152 also may be included. The erasure detector 116 may generate erasure information based on whether the first impulse noise detector 120 detects impulse noise associated with information known a priori by the receiver. Optionally, erasure detector 116 may generate the erasure information further based on whether the second impulse noise detector 140 and/or the third impulse noise detector 152 detects impulse noise. If the impulse noise is detected by at least the first impulse noise detector 120, the erasure detector 116 may generate the erasure information to indicate that transmitted information that is not known a priori by the receiver should be considered an erasure. For example, based on whether the first impulse noise detector 120 detect impulse noise associated with pilot tones or monitored tones in a DMT symbol, the erasure detector 116 may generate the erasure information to indicate that Trellis decoded data associated with the DMT symbol should be considered erasures. For example, the erasure detector 116 may generate the erasure information to indicate that all Trellis decoded data associated with the DMT symbol should be considered erasures.

The decoding system 100 also may include a controller 170. The controller 170 may be separate from the erasure detector 116 or at least partially included within the erasure detector. For example, the controller 170 may include multiple portions such as a hardware portion to generate control signals and a processor portion that executes software or firmware instructions. If the controller 170 includes multiple portions, one or more first portions may be part of the erasure detector 116 and one or more second portions may be separate from the erasure detector 116. For instance, a processor that is utilized by other portions of the receiver may execute instructions that may be considered part of the controller 170.

Although not shown in FIG. 1 in order to improve clarity of the illustration, the controller 170 may be coupled to and provide control signals to various blocks of the erasure detector 116. For example, the controller 170 may be coupled to one or more of the first, second and third impulse noise generators 120, 140, 152. For instance, the controller 170 may be coupled to one or more of the signal generator 124, the comparator 132, the accumulation device 136, the comparator 144, the accumulation device 148, the comparator 156, and the erasure indicator generator 160. For example, the controller 170 may provide the signal generator 124 with information regarding which sub-channels correspond to pilot tones and monitored tones, configuration information for the PRBS, etc. As another example, the controller 70 may provide the comparator 132, the accumulation device 136, the comparator 144, the accumulation device 148, and the comparator 156 with threshold information. Similarly, the controller 170 may provide the erasure indicator generator 160 with configuration information such as what impulse noise indicators to consider and how to use the erasure detector 116 to generate the erasure information.

In one embodiment, information such as configuration information and thresholds may be selected by a software or firmware portion of the controller 170. In this embodiment, the erasure detector 116 may be implemented at least partially using relatively inexpensive and/or easy to implement hardware as compared to the Viterbi decoding device 104, the de-interleaver 108 and the RS decoder 112. Such an embodiment may provide improved erasure detection and flexibility in configuring the erasure detector 116 (via software for example) for a relatively minor increase in hardware. Of course, in other embodiments, more or less of the configuration information and thresholds may be determined by hardware. For example, in some embodiments it may not be possible to change thresholds of one or more of the comparator 132, the accumulation device 136, the comparator 144, the accumulation device 148, and the comparator 156 (i.e., they may be "hard-wired"). As another example, information regarding which sub-channels correspond to pilot tones and monitored tones, configuration information for the PRBS, etc. may be generated by hardware. As still another example, the erasure indicator generator 160 may be "hard-wired", and it may not be possible to configure the erasure indicator generator 160 to ignore certain impulse noise indicators.

Figure 3:
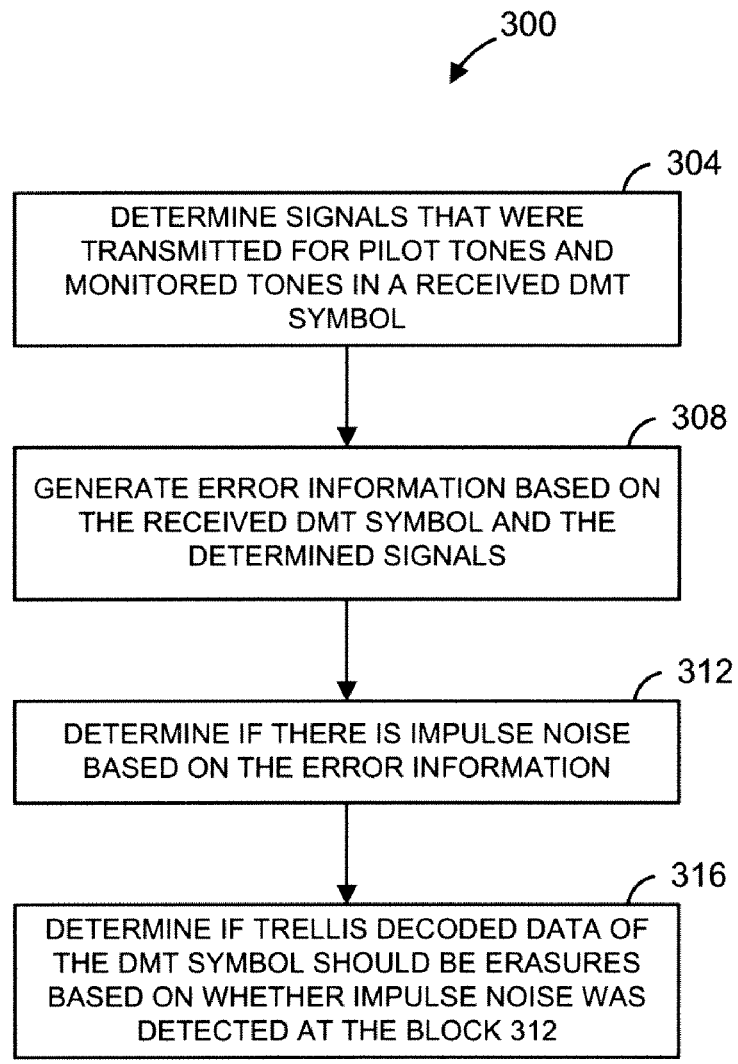
FIG. 3 is a flow diagram of an example method for detecting erasures in a DMT symbol.

FIG. 3 is a flow diagram of an example method 300 for detecting erasures in a DMT symbol. The method may be implemented by the decoding system 100 of FIG. 1, and the method 300 will be discussed with reference to FIG. 3 for ease of explanation. It is to be understood, however, that the method 300 may be implemented by other suitable apparatus as well.

At a block 304, signals that were transmitted for pilot tones and/or monitored tones in a DMT symbol are determined using information known a priori by the receiver. For example, I/Q coordinate pairs corresponding to pilot tones may be defined by a communication protocol, and thus known a priori. As another example, I/Q coordinate pairs corresponding to monitored tones may be determined based on a deterministic sequence such as a pseudo-random sequence. These I/Q coordinate pairs may be determined at the receiver by recreating the deterministic sequence at the receiver, using a PRBS for example. In the example decoding system 100, the signal generator 124 determines the signals that were transmitted for pilot tones and monitored tones in a received DMT symbol.

At a block 308, error information is generated based on pilot tones and/or monitored tones in the received DMT symbol and based on the signals determined at the block 304. Generating the error information may include calculating corresponding errors between received pilot/monitored tones and determined signals corresponding to what was actually transmitted. In the example decoding system 100, the subtraction device 128 may generate the error information.

At a block 312, it may be determined whether impulse noise has affected the received DMT symbol based on the error information generated at the block 308. For example, it may be determined if each error associated with a pilot tones and/or a monitored tone satisfy a first threshold. Also, a number of pilot tones and/or monitored tones having errors exceeding the first threshold may be counted, and it may be determined if the count satisfies a second threshold. As another example, errors of pilot tones and/or monitored tones may be accumulated, and the accumulated error may be compared to a threshold. More generally, determining whether impulse noise has affected the received DMT symbol may include analyzing some measure of accumulated errors associated with pilot tones and/or monitored tones. In the example decoding system 100, the comparator 132 and the accumulator device 136 may implement the block 312.

At a block 316, it may be determined whether trellis decoded data of the DMT symbol should be considered erasures based on whether it was determined at the block 312 that impulse noise had affected the DMT symbol. For example, if impulse noise is detected, trellis decoded data in the DMT symbol may be considered erasures. Of course, determining whether trellis decoded data of the DMT symbol should be considered erasures may be based on other information as well. In the example decoding system 100, the erasure indicator generator 160 may implement the block 316.

Although detecting impulse noise and detecting erasures was described in the context of DMT modulation and DSL systems, similar detection techniques can be used in other contexts as well. For example, similar techniques may be utilized in communication systems using other types of OFDM modulation. For example, impulse noise detection techniques may be used to detect erasures in an OFDM symbol. More generally, information known a priori to a receiver may be used to detect impulse in formatted data units other than OFDM symbols, such as packets, frames, etc. Moreover, if it has been determined that impulse noise has affected a data unit (which may be something other than an OFDM symbol such as a packet, frame, etc.), it may be determined that other data in the data unit should be considered erasures. For example, the formatted data unit may include signals corresponding to a physical layer of a communication protocol, and the information known a priori to the receiver may be associated with these signals. Additionally, the formatted data unit may include payload data that corresponds to layers above the physical layer. In such an embodiment, it may be determined whether payload data should be considered erasures based on whether it is determined that impulse noise affected physical layer signals.

Figure 4:
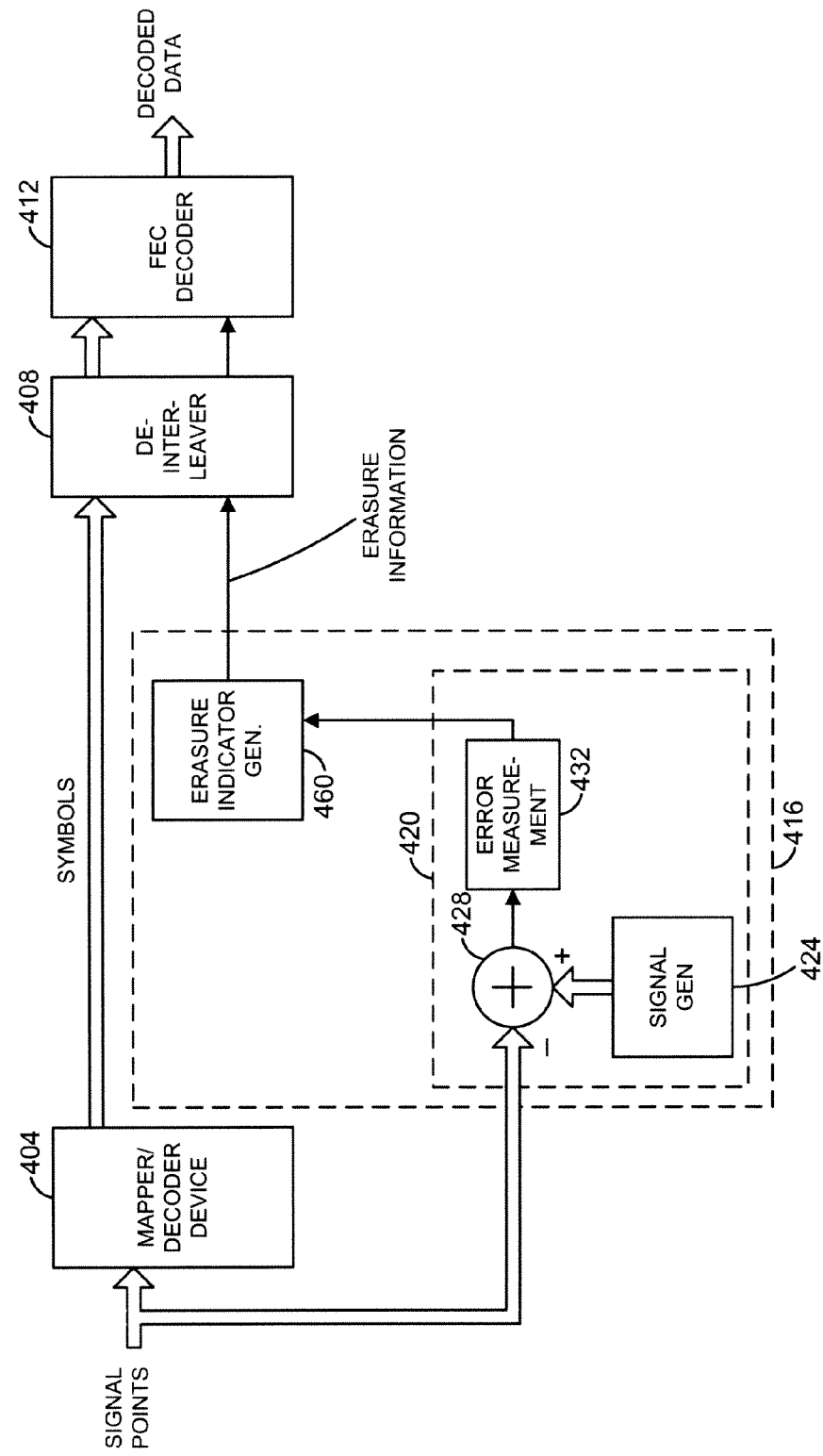
FIG. 4 is a block diagram of an example portion of a receiver that utilizes impulse noise and erasure detection.

FIG. 4 is a block diagram of an example decoding system 400 for use in a receiver or in a receiver portion of a transceiver. The decoding system 100 of FIG. 1 is merely one embodiment of the decoding system 400. The decoding system 400 illustrates that impulse detection and erasure detection techniques that utilize information known a priori to a receiver can be used in a variety of contexts, which may include, but are not limited to, DMT modulation and/or DSL systems. For example, a decoding system such as the decoding system 400 may be utilized in wireless communication systems, digital broadcast systems, cable television systems, etc.

The decoding system 400 includes a mapping device 404 that may receive data from a demodulator portion (not shown) of the receiver. The data received by the mapping device 404 may be data that is at least partially demodulated, such as signal points. For example, if QAM modulation is utilized, the data received by the mapping device 404 may be I and Q coordinate pairs. If other modulation techniques are utilized, the received data may be indicative a frequency information (e.g., for frequency-shift keying modulation), phase information (e.g., for phase-shift keying modulation), amplitude information (e.g., for amplitude-shift keying modulation), etc.

The mapping device 404 attempts to determine which symbols were transmitted by mapping received data to a plurality of possible symbols. Referring again to FIG. 2, the constellation 200 illustrates a mapping for 16 QAM modulation. In particular, the points 204 correspond to the possible symbols or bit sequences that could have been transmitted. The vertical and horizontal lines in FIG. 2 may indicate decision boundaries for the mapping device 404. For example, if a received point falls above the line 208 and to the left of the line 212, the mapping device 404 may decide that the point 204a was transmitted. As another example, if a received point falls within the box surrounding the point 204f, the mapping device 404 may decide that the point 204f was transmitted. Generally, the decoding device 404 maps received data to symbols to generate an output including the symbols.

The mapping device 404 optionally may include a decoder as well, such as a Viterbi decoder. In such an implementation, the mapping/decoder device 404 may act to decode a corresponding FEC code, such as a Trellis code, implemented at the transmitter.

The symbols decoded by the decoding device 404 may be provided to a de-interleaver 408, which attempts to reverse an interleaving process performed at the transmitter.

An output of the de-interleaver (i.e., de-interleaved data) is provided to an FEC decoder 412. The FEC decoder 412 attempts to correct any errors in the de-interleaved data, and generates decoded data. The FEC decoder 412 utilizes erasure information, which is provided by an erasure detector 416. In particular, the erasure information may indicate, for example, the locations of erasures in the mapped data, and the erasure information may be provided to the de-interleaver 408. The de-interleaver 408 may process the erasure information so that the erasure information indicates, for example, the locations of erasures in the mapped data. The erasure information processed by the de-interleaver 408 may be provided to the FEC decoder 412.

The un-mapped data received by the mapping device 404 corresponds to data transmitted to the receiver in formatted data units such as OFDM symbols, DMT symbols, packets, etc. Thus, the mapped data generated by the mapping device 404 also corresponds to data transmitted to the receiver in formatted data units. The erasure detector 416 generally utilizes information associated with a formatted data unit and known a priori by the receiver to determine erasures in the received data unit. For example, the data unit may include physical layer signals and a data payload that corresponds to protocol layers above the physical layer. In such an implementation, the erasure detector 416 may utilize information associated with the physical layer signals and known a priori by the receiver to determine erasures in the payload data.

The erasure detector 416 includes an impulse noise detector 420. Generally, the impulse noise detector 420 attempts to detect impulse noise in a received data unit. Additionally, the impulse noise detector 420 generates an indicator to indicate when impulse noise is detected in the data unit. The impulse noise detector 420 includes a signal generator 424 that generates signals corresponding to information known a priori by the receiver. For example, in an OFDM system in which sub-channels are modulated using QAM, the signal generator 424 may generate QAM signals or I/Q coordinate pairs corresponding to pilot tones or other deterministic signals in the OFDM symbol. A deterministic signal may be, for example, a signal that corresponds to a fixed sequence known by the receiver, a signal that corresponds to a pseudo-random sequence that the receiver can generate, etc. For example, the signal generator 424 may include a PRBS generator the same as or similar to a PRBS generator at the transmitter. The PRBS generator of the signal generator 424 may permit the signal generator 424 to recreate the PRBS used by the transmitter to generate signals in the data unit.

More generally, the signal generator 424 may generate data that corresponds to the particular type of modulation employed. For example, the signal generator 424 may generate frequency data, phase data, amplitude data, etc. The signals generated by the signal generator 424 may correspond to un-mapped data that would have been received by the mapping device 404 if there no errors.

The impulse noise detector 420 may include a subtraction device 428 coupled to the signal generator 424. The subtraction device 428 also receives data that is also received by the decoding device 404. The subtraction device 428 generates an error signal that indicates the actual errors in received signals that are known a priori by the receiver.

The impulse noise detector 420 also may include an error measurement device 432. The error measurement device 432 generally may measure a level of errors corresponding to a data unit detected by the subtraction device 428. For example, the error measurement device 432 may generate an accumulation of errors corresponding to a data unit. The error measurement device 432 also may determine when the level of errors indicates impulse noise, and generates an indicator of impulse noise.

The erasure detector 416 also may include an erasure indicator generator 460, which may be coupled to the impulse noise detector 420. The erasure indicator generator 460 may receive the impulse noise indicator generated by the impulse noise detector 420 and may generate an erasure indicator based on the impulse noise indicator from the impulse noise detector 420. For example, if the impulse noise indicator from the impulse noise detector 420 indicates impulse noise in a data unit, the erasure indicator generator 460 may generate the erasure signal to indicate that symbols in the data unit should be considered erasures. The erasure indicator is provided to the de-interleaver 408.

Similar to the erasure detector 116 of FIG. 1, erasure detector 416 may generate the erasure information further based on information besides the impulse noise indicator generated by the impulse noise detector 420.

In operation, the impulse noise detector 420 detects impulse noise based on information that is known a priori by the receiver. If the impulse noise is detected by at least the impulse noise detector 420, the erasure detector 416 may generate the erasure information to indicate that transmitted information that is not known a priori by the receiver should be considered an erasure. For example, based on whether the impulse noise detector 420 detect impulse noise in connection with the data unit, the erasure detector 116 may generate the erasure information to indicate that mapped data from the data unit should be considered erasures. For example, the erasure detector 416 may generate the erasure information to indicate that all mapped data associated with the data unit should be considered erasures.

The decoding system 400 also may include a controller (not shown). Similar to the controller 170 of FIG. 1, the controller of the system 400 may be utilized for configuration and/or control of the system 400.

Figure 5:
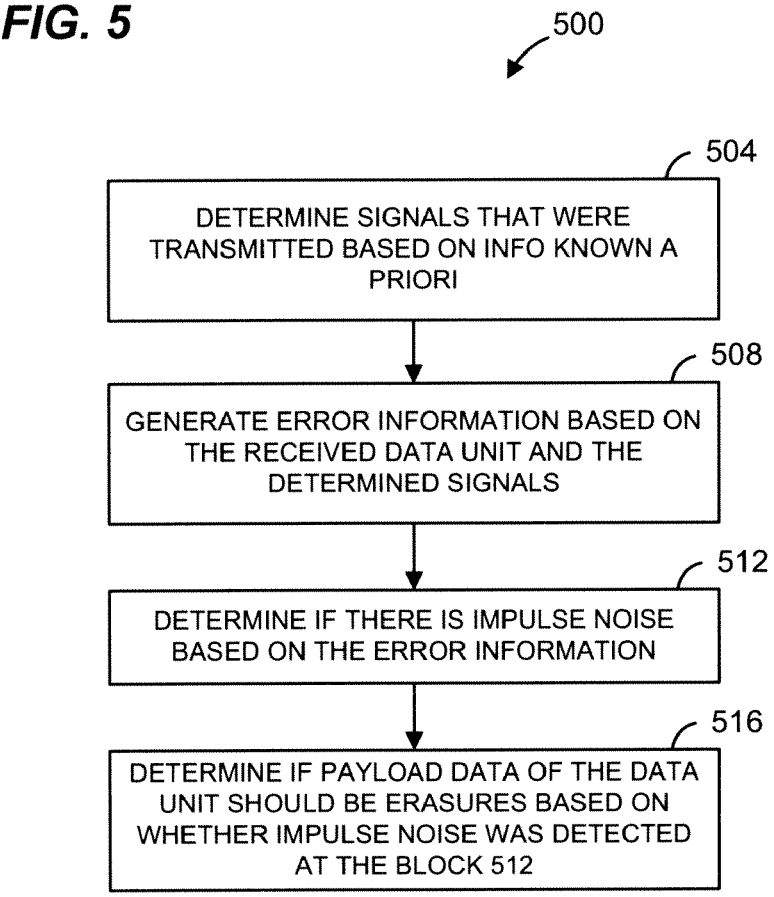
FIG. 5 is a flow diagram of an example method for detecting erasures in a formatted data unit.

FIG. 5 is a flow diagram of an example method 500 for detecting erasures in a formatted data unit. The method 500 may be implemented by the decoding system 400 of FIG. 4, and the method 500 will be discussed with reference to FIG. 4 for ease of explanation. It is to be understood, however, that the method 500 may be implemented by other suitable apparatus as well.

At a block 504, signals that were transmitted as part of a formatted data unit are determined using information known a priori by the receiver. For example, some signals in the data unit may be defined by a physical layer of a communication protocol, and thus may be known a priori by the receiver. As another example, some signals may be generated based on a deterministic sequence such as a pseudo-random sequence. These signals may be determined at the receiver by recreating the deterministic sequence at the receiver, using a PRBS for example. In the example decoding system 400, the signal generator 424 determines the signals that were transmitted as part of the data unit using information known a priori by the receiver.

At a block 508, error information is generated based on the received data unit and based on the signals determined at the block 504. Generating the error information may include calculating corresponding errors between received signals and determined signals corresponding to what was actually transmitted. In the example decoding system 400, the subtraction device 428 may generate the error information.

At a block 512, it may be determined whether impulse noise has affected the received data unit based on the error information generated at the block 508. For example, a level of errors for the data unit may be generated based on the error information generated at the block 508. Then, the error level may be compared to a threshold to determine if impulse noise has affected the data unit. In the example decoding system 400, the error measurement device 432 may implement the block 512.

At a block 516, it may be determined whether payload data of the data unit should be considered erasures based on whether it was determined at the block 512 that impulse noise had affected the data unit. For example, if impulse noise is detected, payload data in the data unit may be considered erasures. Of course, determining whether payload data should be considered erasures may be based on other information as well. In the example decoding system 400, the erasure indicator generator 460 may implement the block 516.

The apparatus and methods described above may be utilized in a variety of devices such as wireless communication devices, consumer electronics devices, modems, etc. As a specific example, apparatus and methods such as described above may be utilized in DSL modems.

Figure 6A:
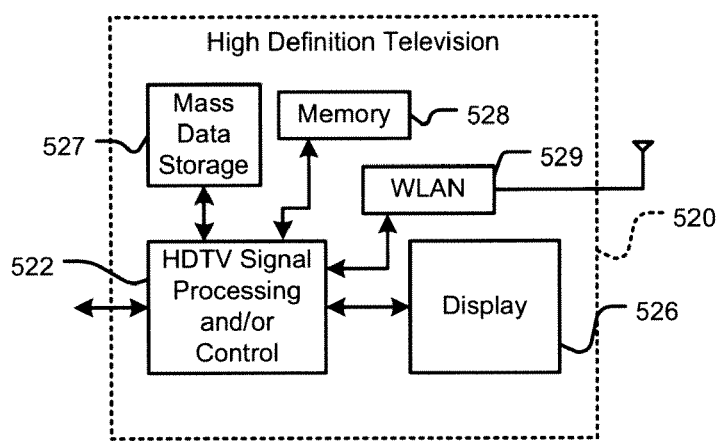
FIG. 6A is a block diagram of a high definition television that may utilize impulse noise and/or erasure detection techniques such as described herein.

Referring now to FIGS. 6A-6F, various example devices will be described that may utilize impulse noise and/or erasure detection techniques such as described above. Referring to FIG. 6A, such techniques may be utilized in a high definition television (HDTV) 520. The HDTV 520 includes signal processing and/or control circuits, which are generally identified in FIG. 6A at 522, a WLAN network interface 529, and a mass data storage 527. Impulse noise and/or erasure detection techniques may be utilized in the WLAN network interface 529 or the signal processing circuit and/or control circuit 522, for example. HDTV 520 receives HDTV input signals in either a wired or wireless format and generates HDTV output signals for a display 526. In some implementations, signal processing circuit and/or control circuit 522 and/or other circuits (not shown) of HDTV 520 may process data, perform coding and/or encryption, perform calculations, format data and/or perform any other type of HDTV processing that may be required.

HDTV 520 may communicate with mass data storage 527 that stores data in a nonvolatile manner such as optical and/or magnetic storage devices. The mass data storage 527 may include one or more hard disk drives (HDDs) and/or one or more digital versatile disks (DVDs). One or more of the HDDs may be a mini HDD that includes one or more platters having a diameter that is smaller than approximately 1.8". HDTV 520 may be connected to memory 528 such as RAM, ROM, low latency nonvolatile memory such as flash memory and/or other suitable electronic data storage. HDTV 520 also may support connections with a WLAN via the WLAN network interface 529.

Figure 6B:
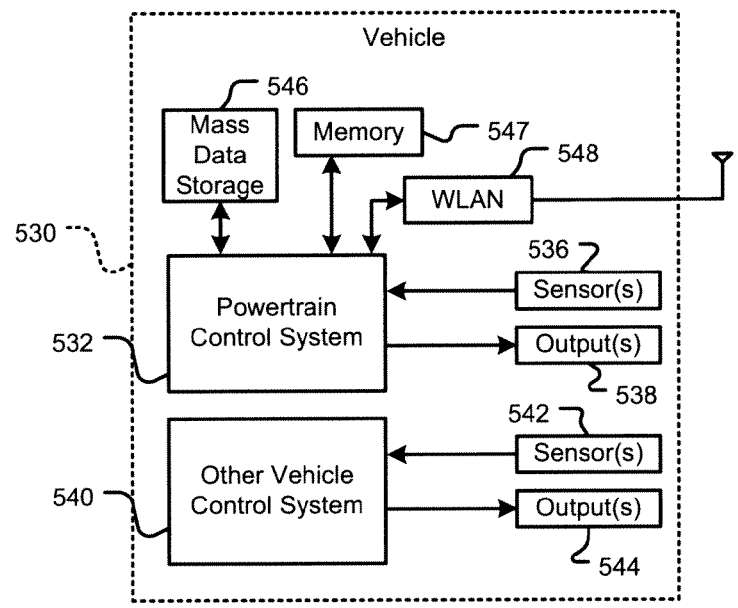
FIG. 6B is a block diagram of a vehicle that may utilize impulse noise and/or erasure detection techniques such as described herein.

Referring now to FIG. 6B, impulse noise and/or erasure detection techniques such as described above may be utilized in a control system of a vehicle 530. In some implementations, a powertrain control system 532 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 540 may likewise receive signals from input sensors 642 and/or output control signals to one or more output devices 544. In some implementations, control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 532 may communicate with mass data storage 546 that stores data in a nonvolatile manner. Mass data storage 546 may include optical and/or magnetic storage devices for example hard disk drives (HDDs) and/or DVDs. One or more of the HDDs may be a mini HDD that includes one or more platters having a diameter that is smaller than approximately 1.8". Powertrain control system 532 may be connected to memory 547 such as RAM, ROM, low latency nonvolatile memory such as flash memory and/or other suitable electronic data storage. Powertrain control system 532 also may support connections with a WLAN via a WLAN network interface 548. Impulse noise and/or erasure detection techniques such as described above may be implemented in the WLAN network interface 548. The control system 540 may also include mass data storage, memory and/or a WLAN interface (all not shown).

Figure 6C:
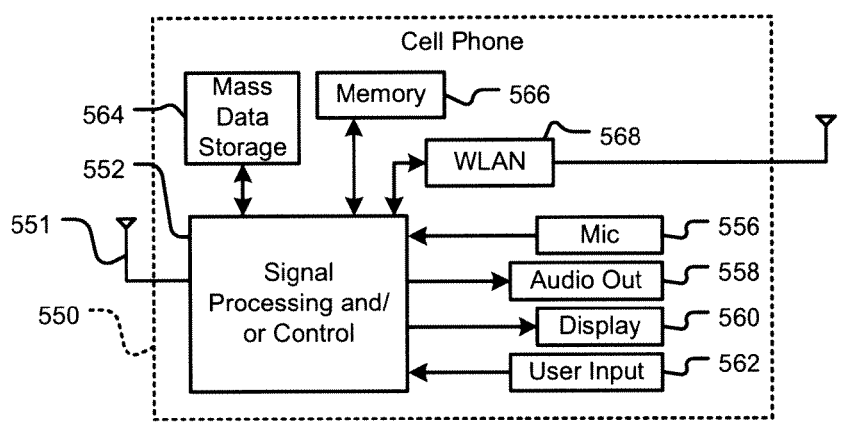
FIG. 6C is a block diagram of a cellular phone that may utilize impulse noise and/or erasure detection techniques such as described herein.

Referring now to FIG. 6C, techniques such as described above may also be utilized in a cellular phone 550 that may include a cellular antenna 551. The cellular phone 550 includes signal processing and/or control circuits, which are generally identified in FIG. 6C at 552, a WLAN network interface 568, and a mass data storage 564. Impulse noise and/or erasure detection techniques may be implemented in the signal processing and/or control circuits 552 and/or the WLAN network interface 568, for example. In some implementations, cellular phone 550 includes a microphone 556, an audio output 558 such as a speaker and/or audio output jack, a display 560 and/or an input device 562 such as a keypad, pointing device, voice actuation and/or other input device. Signal processing and/or control circuits 552 and/or other circuits (not shown) in cellular phone 550 may process data, perform coding and/or encryption, perform calculations, format data and/or perform other cellular phone functions.

Cellular phone 550 may communicate with mass data storage 564 that stores data in a nonvolatile manner such as optical and/or magnetic storage devices for example hard disk drives (HDDs) and/or DVDs. At least one HDD may be a mini HDD that includes one or more platters having a diameter that is smaller than approximately 1.8". Cellular phone 550 may be connected to memory 566 such as RAM, ROM, low latency nonvolatile memory such as flash memory and/or other suitable electronic data storage. Cellular phone 550 also may support connections with a WLAN via the WLAN network interface 568.

Figure 6D:
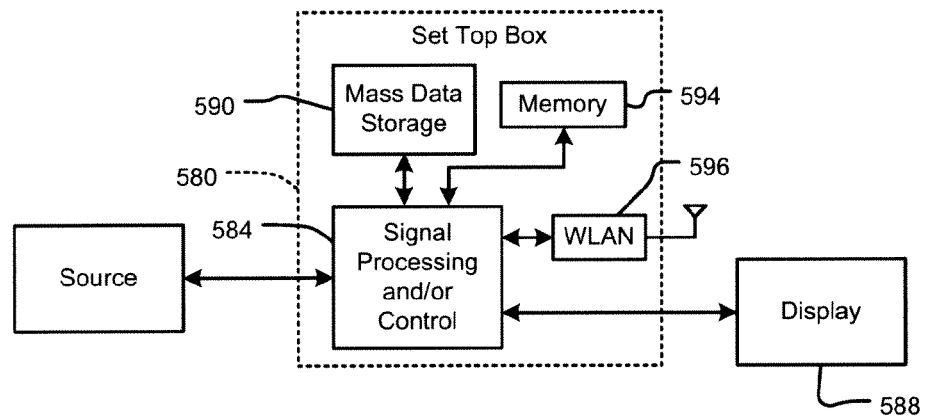
FIG. 6D is a block diagram of a set top box that may utilize impulse noise and/or erasure detection techniques such as described herein.

Referring now to FIG. 6D, techniques such as described above may be utilized in a set top box 580. The set top box 580 includes signal processing and/or control circuits, which are generally identified in FIG. 6D at 584, a WLAN network interface 596, and a mass data storage device 590. Impulse noise and/or erasure detection techniques may be implemented in the signal processing and/or control circuits 584 and/or the WLAN network interface 596, for example. Set top box 580 receives signals from a source such as a broadband source and outputs standard and/or high definition audio/video signals suitable for a display 588 such as a television and/or monitor and/or other video and/or audio output devices. Signal processing and/or control circuits 584 and/or other circuits (not shown) of the set top box 580 may process data, perform coding and/or encryption, perform calculations, format data and/or perform any other set top box function.

Set top box 580 may communicate with mass data storage 590 that stores data in a nonvolatile manner. Mass data storage 590 may include optical and/or magnetic storage devices for example hard disk drives (HDDs) and/or DVDs. At least one HDD may be a mini HDD that includes one or more platters having a diameter that is smaller than approximately 1.8". Set top box 580 may be connected to memory 594 such as RAM, ROM, low latency nonvolatile memory such as flash memory and/or other suitable electronic data storage. Set top box 580 also may support connections with a WLAN via the WLAN network interface 596.

Figure 6E:
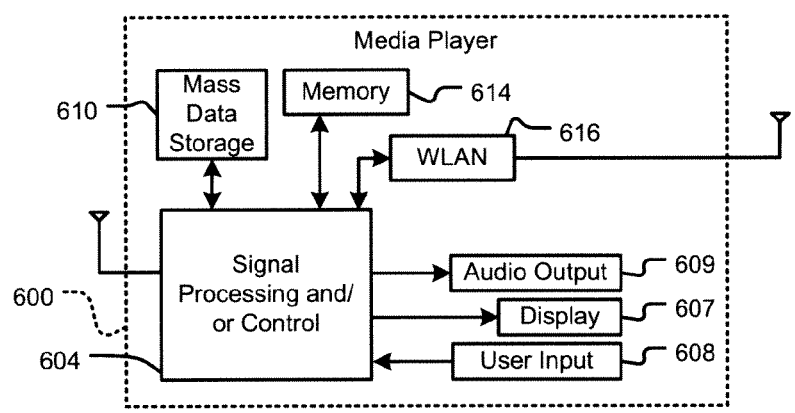
FIG. 6E is a block diagram of a media player that may utilize impulse noise and/or erasure detection techniques such as described herein.

Referring now to FIG. 6E, techniques such as described above may be utilized in a media player 600. The media player 600 may include signal processing and/or control circuits, which are generally identified in FIG. 6E at 604, a WLAN network interface 616, and a mass data storage device 610. Impulse noise and/or erasure detection techniques may be implemented in the signal processing and/or control circuits 604 and/or the WLAN network interface 616, for example. In some implementations, media player 600 includes a display 607 and/or a user input device 608 such as a keypad, touchpad and the like. In some implementations, media player 600 may employ a graphical user interface (GUI) that typically employs menus, drop down menus, icons and/or a point-and-click interface via display 607 and/or user input device 608. Media player 600 further includes an audio output 609 such as a speaker and/or audio output jack. Signal processing and/or control circuits 604 and/or other circuits (not shown) of media player 600 may process data, perform coding and/or encryption, perform calculations, format data and/or perform any other media player function.

Media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives (HDDs) and/or DVDs. At least one HDD may be a mini HDD that includes one or more platters having a diameter that is smaller than approximately 1.8". Media player 600 may be connected to memory 614 such as RAM, ROM, low latency nonvolatile memory such as flash memory and/or other suitable electronic data storage. Media player 600 also may support connections with a WLAN via the WLAN network interface 616. Still other implementations in addition to those described above are contemplated.

FIG. 6E illustrates an antenna coupled to the signal processing and/or control circuits 604. The antenna may be a loop antenna, a whip antenna, headphone wires, a metal pad, a metal pad mounted on a device that so that, when worn, the metal pad will be in contact with a person's skin, etc.

Figure 6F:
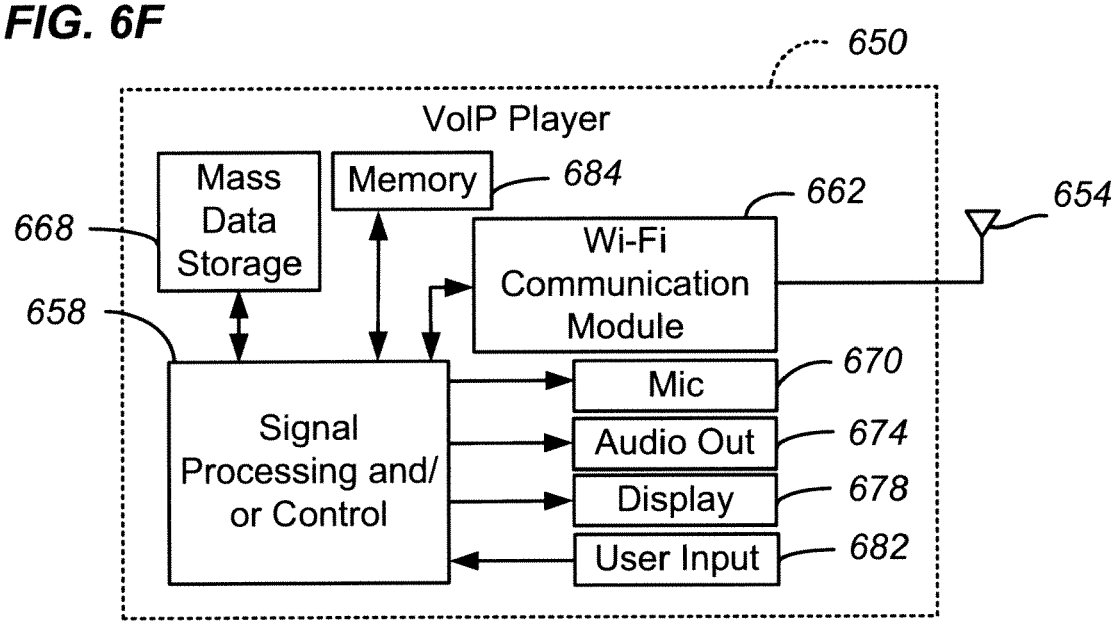
FIG. 6F is a block diagram of a voice over IP device that may utilize impulse noise and/or erasure detection techniques such as described herein.

Referring to FIG. 6F, techniques such as described above may be utilized in a Voice over Internet Protocol (VoIP) phone 650 that may include an antenna 654, signal processing and/or control circuits 658, a wireless interface 662, and a mass data storage 668. Impulse noise and/or erasure detection techniques such as described above may be implemented in the signal processing and/or control circuits 658 and/or the wireless interface 662, for example. In some implementations, VoIP phone 650 includes, in part, a microphone 670, an audio output 674 such as a speaker and/or audio output jack, a display monitor 678, an input device 682 such as a keypad, pointing device, voice actuation and/or other input devices, and a Wireless Fidelity (Wi-Fi) communication module 662. Signal processing and/or control circuits 658 and/or other circuits (not shown) in VoIP phone 650 may process data, perform coding and/or encryption, perform calculations, format data and/or perforin other VoIP phone functions.

VoIP phone 650 may communicate with mass data storage 668 that stores data in a nonvolatile manner such as optical and/or magnetic storage devices, for example hard disk drives (HDDs) and/or DVDs. The HDD may be a mini HDD that includes one or more platters having a diameter that is smaller than approximately 1.8". VoIP phone 650 may be connected to memory 684, which may be a RAM, ROM, low latency nonvolatile memory such as flash memory and/or other suitable electronic data storage. VoIP phone 650 is configured to establish communications link with a VoIP network (not shown) via Wi-Fi communication module 662.

Although in the examples above, certain blocks were described as being implemented in hardware, software, or firmware, it will be understood that more generally any of the various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). The software may be machine readable instructions that are capable of causing one or more processors to perform various acts. When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, additions or deletions in addition to those explicitly described above may be made to the disclosed embodiments without departing from the scope of the invention.

What is claimed is:

1. A method, comprising:
   receiving, at a receiver, a discrete multi-tone (DMT) symbol transmitted by a transmitter;
   determining received signal points based on the received DMT symbol;
   determining, at the receiver and based on information known a priori by the receiver, actual transmitted signal points corresponding to pilot tones and monitored tones in the received DMT symbol, wherein:
   each pilot tone is generated at the transmitter as a corresponding sequence of signal points,
   each sequence of signal points corresponding to a pilot tone is known a priori by the receiver,
   each monitored tone is generated at the transmitter as a corresponding sequence of signal points and at least one of the monitored tones is generated at the transmitter using a pseudo-random sequence, and
   determining actual transmitted signal points includes recreating, at the receiver, the pseudo-random sequence utilized at the transmitter to generate the at least one monitored tone;
   determining an error between the received signal points and the actual transmitted signal points determined at the receiver; and
   generating an indicator of impulse noise based on the error.

2. A method according to claim 1, wherein determining the error between the received signal points and the actual transmitted signal points determined at the receiver comprises:
   determining an accumulated error based on individual errors corresponding to a plurality of pilot tones and monitored tones.

3. A method according to claim 2, wherein determining the accumulated error comprises:
   determining individual errors corresponding to the plurality of pilot tones and monitored tones; and
   counting a number of individual errors that satisfy a first threshold;
   wherein generating the indicator of impulse noise is based on the number of individual errors that satisfy the first threshold.

4. A method according to claim 3, further comprising determining whether the number of individual errors that satisfy the first threshold satisfies a second threshold;
   wherein generating the indicator of impulse noise is based on whether the second threshold is satisfied.

5. A method according to claim 1, further comprising determining erasures in data corresponding to sub-carriers of the DMT symbol with non-zero bit-loading based on the indicator of impulse noise.

6. A method according to claim 5, wherein determining erasures in data corresponding to sub-carriers of the DMT symbol with non-zero bit-loading includes determining that data corresponding to all sub-carriers of the DMT symbol with non-zero bit-loading should be erasures.

7. A method according to claim 1, wherein the actual transmitted signal points determined at the receiver correspond to signals in a first portion of the received DMT symbol;

wherein the method further comprises determining erasures in data in a second portion of the received DMT symbol based on the indicator of impulse noise.

8. A method according to claim 7, wherein the first portion corresponds to signals defined by a physical layer of a communication protocol; and
wherein the second portion corresponds to a payload of the received DMT symbol.

9. An apparatus for use in a receiver, the apparatus comprising:
an impulse noise detector including:
a signal generator to generate, based on information known a priori by the signal generator, actual transmitted signal points corresponding to pilot tones and monitored tones in a discrete multi-tone (DMT) symbol transmitted by a transmitter, wherein:
each pilot tone is generated at the transmitter as a corresponding sequence of signal points,
each sequence of signal points corresponding to a pilot tone is known a priori by the signal generator,
each monitored tone is generated at the transmitter as a corresponding sequence of signal points and at least one of the monitored tones is generated by the transmitter using a pseudo-random sequence,
the signal generator is configured to recreate the pseudo-random sequence utilized at the transmitter to generate the at least one monitored tone; and
an error measurement device to generate an indicator of impulse noise based on errors between i) actual transmitted signal points generated by the signal generator and ii) received signal points determined based on the received DMT symbol.

10. An apparatus according to claim 9, wherein the signal generator includes a pseudo-random bit sequence generator to recreate the pseudo-random bit sequence utilized at the transmitter to generate the at least one monitored tone.

11. An apparatus according to claim 9, wherein the impulse noise detector includes a subtraction device to generate an error signal based on a difference between i) the actual transmitted signal points generated by the signal generator and ii) received signal points;
wherein the error measurement device generates the indicator of impulse noise based on the error signal generated by the subtraction device.

12. An apparatus according to claim 9, further comprising a mapper to map the received signal points to symbols.

13. An apparatus according to claim 12, further comprising an erasure indicator generator to generate an erasure indicator based on the indicator of impulse noise.

14. An apparatus according to claim 13, wherein the impulse noise detector detects impulse noise based on signal points corresponding to signals in a first portion of a received formatted data unit;
wherein the erasure indicator generator generates an erasure indicator corresponding to data in a second portion of the received formatted data unit.

15. An apparatus according to claim 14, wherein the first portion corresponds to signals defined by a physical layer of a communication protocol; and
wherein the second portion corresponds to a payload of the received formatted data unit.

16. An apparatus according to claim 14, further comprising a de-interleaver coupled to the mapper and the erasure indicator generator.

17. A method, comprising:
receiving, at a receiver, a discrete multi-tone (DMT) symbol having i) first sub-carriers that do not carry payload data and ii) second sub-carriers that carry payload data, wherein the first sub-carriers correspond to sub-carriers having non-zero power and zero bit-loading, and wherein the second sub-carriers correspond to sub-carriers having non-zero power and non-zero bit-loading;
determining first received signal points corresponding to first sub-carriers of the received DMT symbol;
determining, at the receiver, actual transmitted signal points corresponding to the first received signal points based on information known a priori by the receiver;
determining an error between i) the first received signal points and ii) the actual transmitted signal points determined at the receiver;
generating an indicator of impulse noise based on the error; and
generating an indicator of erasures in the payload data based on the indicator of impulse noise.

18. A method according to claim 17, wherein determining, at the receiver, actual transmitted signal points comprises recreating at the receiver a pseudo-random bit sequence generated at the transmitter and used by the transmitter to generate at least some signal points corresponding to the first sub-carriers.

19. An apparatus for use in a receiver, the apparatus comprising:
a Viterbi decoding device to generate Trellis-decoded symbols based on a received discrete multi-tone (DMT) symbol, wherein the DMT symbol includes first sub-carriers that do not carry payload data and second sub-carriers that carry payload data, wherein the first sub-carriers include pilot tones and monitored tones;
an impulse noise detector to generate an indicator of impulse noise based on
i) received first sub-carriers, and
ii) actual transmitted signal points corresponding to first sub-carriers recreated by the impulse noise detector based on information known a priori by the impulse noise detector, wherein the impulse noise detector includes:
(a) a signal generator to generate, based on information known a priori by the impulse noise detector, actual transmitted signal points corresponding to pilot tones and monitored tones in the DMT symbol transmitted by a transmitter, wherein:
each pilot tone is generated at the transmitter as a corresponding sequence of signal points,
each sequence of signal points corresponding to a pilot tone is known a priori by the signal generator,
each monitored tone is generated at the transmitter as a corresponding sequence of signal points and at least one of the monitored tones is generated by the transmitter using a pseudo-random sequence, and
the signal generator is configured to recreate the pseudo-random sequence utilized at the transmitter to generate the at least one monitored tone;
(b) an error measurement device to generate an indicator of impulse noise based on errors between i) actual transmitted signal points generated by the signal generator and ii) received signal points determined based on the received DMT symbol; and
an erasure detector to generate indications of erasures in payload data based on the impulse noise indicator.

20. An apparatus according to claim 19, further comprising a de-interleaver coupled to i) the Viterbi decoding device and ii) the erasure detector.

21. An apparatus according to claim 19, wherein the signal generator includes a pseudo-random bit sequence generator to recreate the pseudo-random bit sequence generated at the transmitter.

* * * * *